(12) United States Patent
Yu (10) Patent No.: US 10,657,664 B2
(45) Date of Patent: May 19, 2020

(54) METHOD AND SYSTEM FOR IMAGE-BASED IMAGE RENDERING USING A MULTI-CAMERA AND DEPTH CAMERA ARRAY

(71) Applicant: Jingyi Yu, Newark (DE)

(72) Inventor: Jingyi Yu, Newark (DE)

( * ) Notice: Subject to any disclaimer, the term of this patent is extended or adjusted under 35 U.S.C. 154(b) by 120 days.

(21) Appl. No.: 16/004,430

(22) Filed: Jun. 11, 2018

(65) Prior Publication Data

US 2018/0293744 A1 Oct. 11, 2018
US 2020/0090354 A9 Mar. 19, 2020

Related U.S. Application Data

(63) Continuation of application No. PCT/US2016/065689, filed on Dec. 9, 2016.

(60) Provisional application No. 62/265,998, filed on Dec. 11, 2015.

(51) Int. Cl.

| | |
|---|---|
| *G06T 7/50* | (2017.01) |
| *G06T 15/06* | (2011.01) |
| *H04N 13/111* | (2018.01) |
| *H04N 13/243* | (2018.01) |
| *H04N 13/254* | (2018.01) |
| *H04N 13/246* | (2018.01) |
| *H04N 13/271* | (2018.01) |
| *G06T 7/80* | (2017.01) |
| *G06T 15/20* | (2011.01) |

(52) U.S. Cl.
CPC .............. *G06T 7/50* (2017.01); *G06T 7/80* (2017.01); *G06T 15/06* (2013.01); *G06T 15/205* (2013.01); *H04N 13/111* (2018.05); *H04N 13/243* (2018.05); *H04N 13/246* (2018.05); *H04N 13/254* (2018.05); *H04N 13/271* (2018.05); *G06K 2209/40* (2013.01); *G06T 2207/10028* (2013.01); *G06T 2215/16* (2013.01)

(58) Field of Classification Search
None
See application file for complete search history.

(56) References Cited

U.S. PATENT DOCUMENTS

| | | | |
|---|---|---|---|
| 6,621,925 B1* | 9/2003 | Ohmori | G06T 15/005 |
| | | | 358/518 |
| 2010/0329358 A1* | 12/2010 | Zhang | H04N 19/597 |
| | | | 375/240.26 |
| 2013/0058591 A1* | 3/2013 | Nishiyama | H04N 5/217 |
| | | | 382/264 |
| 2015/0145966 A1* | 5/2015 | Krieger | G06T 17/20 |
| | | | 348/47 |
| 2016/0073080 A1* | 3/2016 | Wagner | G06T 5/006 |
| | | | 348/47 |

\* cited by examiner

*Primary Examiner* — Kyle Zhai (57) ABSTRACT

A method and system for capturing images and depth for image-based rendering. Capture is made by a multi-camera configuration using a combination of image and depth cameras. Rendering utilizes scene geometry derived from image and depth data.

15 Claims, 11 Drawing Sheets

METHOD AND SYSTEM FOR IMAGE-BASED IMAGE RENDERING USING A MULTI-CAMERA AND DEPTH CAMERA ARRAY

This application is a continuation of International Application No. PCT/US2016/065689, filed on Dec. 9, 2016, which claims priority to U.S. Provisional Application No. 62/265,998, filed on Dec. 11, 2015. Both of the aforementioned applications are hereby incorporated by reference in their entireties.

Images and video can be created using multiple techniques. For image-based rendering, wherein an image is created based on other images, there are issues in determining certain contextual pieces of information, despite the number of images available to be sampled. In order to increase the quality or accuracy from a human visual perspective of a 2-dimensional (2D) or 3-dimensional (3D) images or video, a process needs to render the individual image by understanding context, such as the depths of objects or scene geometry in an image. However, this is potentially impossible to do unless other information is provided to the process.

In non-image based computer-generated rendering using geometric models (e.g. rasterization, ray-tracing, etc.), where the image is not solely rendered or reconstructed from only images, a user is able to know the scene depths from the view of the rendering camera. For example, if a user creates or renders an individual object, then the object's depth is known and would therefore be pre-determined when the object is then placed in a scene and final scene depths are computed.

In an image-based rendering process, a pre-existing object in a scene could have depth that is unknown. A user could arbitrarily decide an initial depth or proxy geometry for a point on the pre-existing object and reference all other relative depths relative to the arbitrarily chosen depth. However, this may not be accurate because the depth is arbitrarily chosen by a user. In addition, depth may be determined using computer vision techniques, such as structure from motion, but these techniques are extremely process-heavy, require a lot of resources, is not accurate, and not as useful for real-time unless they are pre-computed.

Many of these depth techniques are methods to either arbitrarily or programmatically determine to the nearest degree possible, with whatever, acceptable loss, the depth of points in a scene. However, much like when an image camera is out of focus, when an image is not properly reconstructed from the various inputs, in this case other images, the reconstructed image can appear out of focus or unclear. Alternatively, the rendered image could have artifacts, or other errors of the image.

BRIEF DESCRIPTION OF THE DRAWINGS

FIG. 1b demonstrates a 1D cross-sectional view of a multi-camera array of FIG. 1a.

DETAILED DESCRIPTION

Image-based rendering uses an existing set of sampled images to generate new images for novel camera views. In other words, an image-based render is a rendering of an image that is derived from other images captured from image cameras.

A light field is an example image based rendering technique using a 4D parametrization (u, v, s, t) describing all the rays between two planes using the (u,v) and (s,t) index respectively. A camera that captures a light field, captures a subset of the complete light field sampled at the camera positions.

A novel camera, also known as a virtual camera at an arbitrary or user-defined position, is the camera derived from the other actual image capture cameras. When constructing a new image, a ray is determined for the novel camera for each pixel in the new image (based on camera position to the pixel in the image plane). That ray is computed using various methods, the most common is to interpolate between the closest ray samples from the existing images.

The potential problem with image based rendering is that there are not enough sample rays in the sample images then you will have artifacts such as aliasing in the generated images. Without enough samples, images must be reconstructed from the existing samples. Without additional information, just using image samples may not achieve desired results because you don't know which rays you should be using. The simplest method of using the closest ray may not give the desired image. This is because the scene geometries are unknown at the time (e.g. from real camera captures). This can be resolved by using an arbitrary focal plane or using a geometry proxy. A geometry proxy can be created by hand or using computer vision techniques, such as structure from motion.

In one example embodiment of the invention, a combination of one or more image cameras and one or more depth cameras may be used to create a point cloud of the scene. The one or more image cameras may be, for example, situated in a multi-camera array, or light field camera, to capture the images of a scene. The one or more depth cameras may be used to capture the scene depths. Using more depth cameras can provide a better reconstruction of the scene. More cameras can alleviate occlusion problems caused by objects in front of other objects which obscures the view of the camera.

An example of an occlusion problem could be objects in front of other objects that block the view of the color or depth cameras to the object farther in depth.

Just adding depth cameras is not a complete solution because of the above occlusion problem and the general sampling problems similar to that of just using images to create another image. We use a new rendering process that can incorporate the new depth data. With the depth data the scene geometry is now known so that when we construct a novel view for a desired ray we first determine the depth of that ray in the scene (e.g. the point in the scene that the ray intersections), then determine which rays in the sample images intersect at the same point and is closest in orientation, and then use those rays to interpolate a final ray. This happens for all the rays in the novel view.

However, the depth data acquired is only a point cloud because it is a sampling of depth in the scene. The point cloud is triangulated to get the scene geometry, which is the conversion of the point cloud data to a polygon or triangle mesh. In areas where there are still occlusions, depth can be approximated by extrusion. Extrusion is where depth is approximated by extending the measured depth (point in the point cloud) to neighboring depths which may not be on the same object. Alternatively, depth can be approximated by using information from the image cameras to approximate the occlusions if the depth and images are from different camera positions. Alternatively, depth can be fixed manually by setting a focal plane or proxy mesh.

An example embodiment of the invention is to acquire depth and color images using one or more depth and color image cameras. For the purpose of clarity, the color image need not be in color, it could be black and white; however, the use of color here is used to distinguish a depth image, which provides a depth at every pixel of the image. Depth images form a point cloud, which is triangulated into a triangle mesh, representing the geometry of the scene. A depth map is created at each camera position for every image in the scene. Every image will have a created pre-computed depth map in order to quickly compare depths in later steps. Another depth map is created for the novel camera position. For each ray in the novel camera image, the four closest cameras to the ray are picked to get the closest ray depth and color from each camera. The number of cameras picked is arbitrary and based on the rendering effect desired. Colors are interpolated using the colors from the input cameras with the depths, computed from the triangulated geometry or pre-computed using depth maps, similar to the desired depth of the novel camera relative to a reference position, within some threshold of the pixel in the novel camera, and with other colors and depths that are not close thrown out. The interpolated color is used as the color for the pixel in the final novel image.

In another example embodiment of the invention, images and depth captures are also can help with other image based rendering style techniques such as lumigraph rendering or spherical or panoramic videos.

In an example embodiment of the invention, a method of rendering new images, may comprise the acquiring a set of images using an image camera, acquiring a set of depth images using depth cameras, converting depth images to a scene geometry representation from the set of depth images, rendering new images from the set of images using the scene geometry representation to generate a reconstructed image from the view of a novel camera. In the method the scene geometry may be derived from a point cloud, which in turn may be derived from the depth information from the cameras. The cameras may be situated in a multi-array pattern of various configurations, such as a grid in a plane, a grid in a box, an outside-in facing grid, an inside-out facing grid, a circle grid, etc. The multi-array configuration may contain any combination of depth cameras, image cameras, or depth-plus-image hybrid cameras to obtain both depth information and image information. In order to utilize the depth data with the image data, the cameras may be pre-calibrated before capturing images in a scene. The cameras may be calibrated using known objects, objects with known depths or patterns, or objects that can be scene by either all cameras or by at least one camera calibrated to other cameras. In an example embodiment of the invention, the scene geometry may be used to determine rays to be used in the final image. The determination of rays used for the final pixels may be those that have similar depth with the rays of a novel camera relative to a common position.

A system for creating a rendering of images may use the above method and the system may be comprised of any of a configuration of one or more cameras, wherein the cameras are a combination of image cameras, depth cameras, or image-plus-depth hybrid cameras. The system may also contain a processor to compute scene geometry and render images as well as a storage medium to store the input data.

Detailed descriptions of the above example embodiments may be illustrated herein.

Figure 1A:
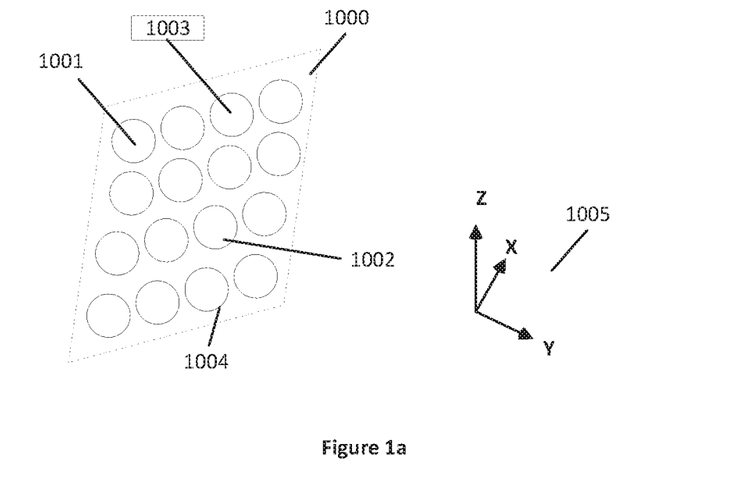
FIG. 1a illustrates an example of a multi-camera array.

FIG. 1a illustrates an example of a multi-camera array. The multi-camera array grid frame 1000 has many individual cameras 1001-1004. Because it has more than one image captured, in this case cameras across a 2D axis 1005, the collective images can be used to create new images or singular objects or scenes in 3-dimensions (3D). In the figure, the multi-camera array is in a square pattern with a fixed distance between the cameras. For example, the distance between camera 1001 and camera 1003 would be the same between 1002 and 1004. In the 3D axis 1005, the y-axis is pointed towards a hypothetical object of which an image is captured. The x-axis and z-axis represent the location of the camera on each axis. However, the cameras need not be situated in a grid pattern. The camera positioning can be arbitrary including a 1D array. Other example camera arrangements include spherical with all the cameras looking inward to middle or outward. The particular 2D array 1000 can be represented instead as a 1-dimensional (1D) array for the sake of explaining the functionality of the array's rays.

Figure 1B:
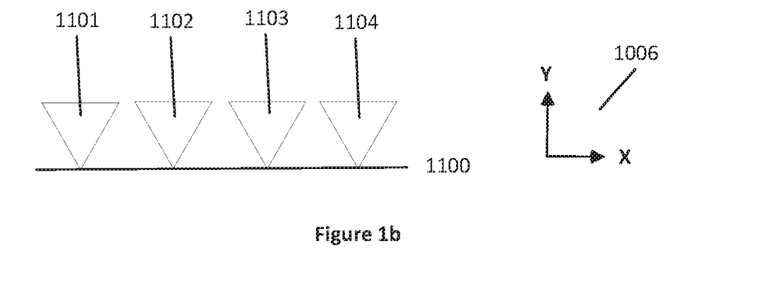

FIG. 1b demonstrates a 1D cross-sectional view of a multi-camera array of FIG. 1a. The line 1100 represent the grid frame 1000. The cameras 1101-1104 each represent of the column in the original grid frame, which in the example would be 4 cameras. The axis 1006 is now in 2D and only showing the x-axis and the y-axis, where the y-axis still points toward the camera direction where an image could be captured, and the x-axis shows the camera location along that axis.

Figure 2:
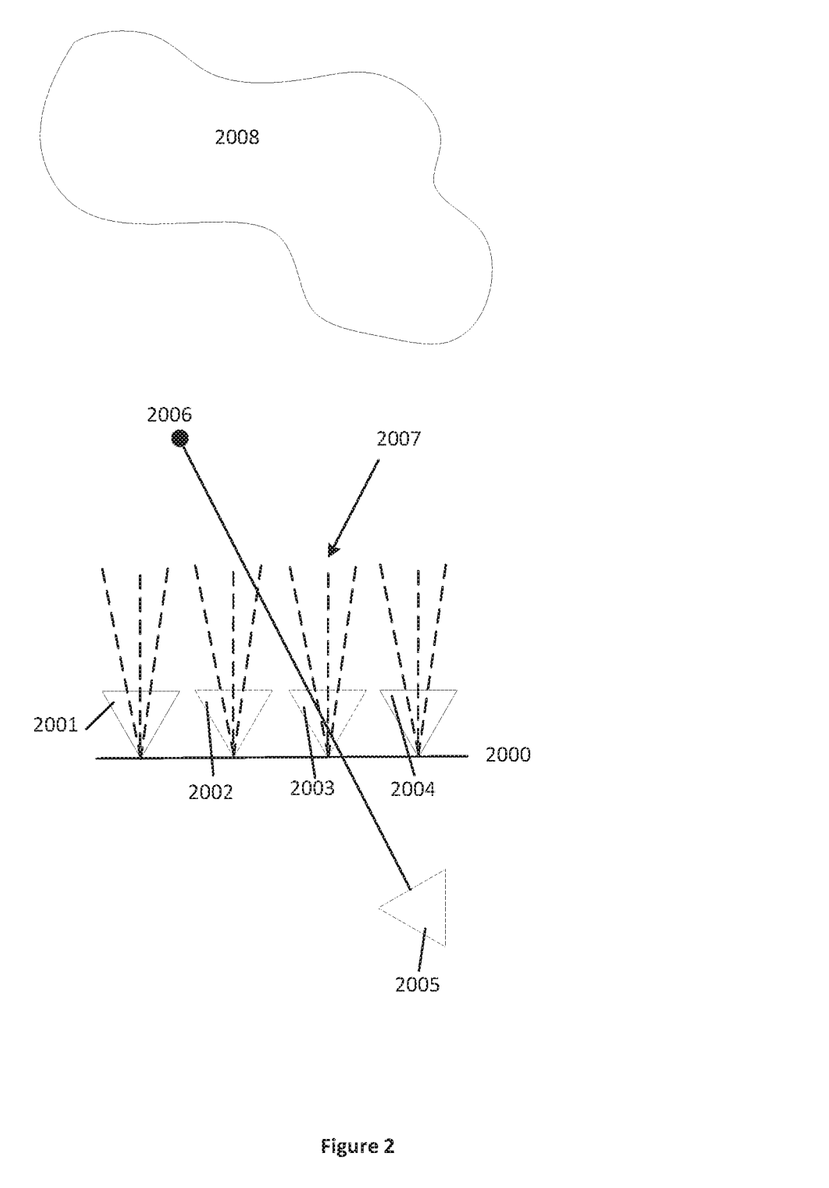
FIG. 2 illustrates an image-camera array with a novel camera.

FIG. 2 illustrates an image-camera array with a novel camera. In the figure, there is a 2D representation of a camera grid 2000 with image cameras 2001-2004. There is also a virtual camera 2005 which is positioned to capture a specific point 2006. In order to do this it must utilize a ray 2007 from camera 2001. The point could have been from an object in space 2008.

Figure 3:
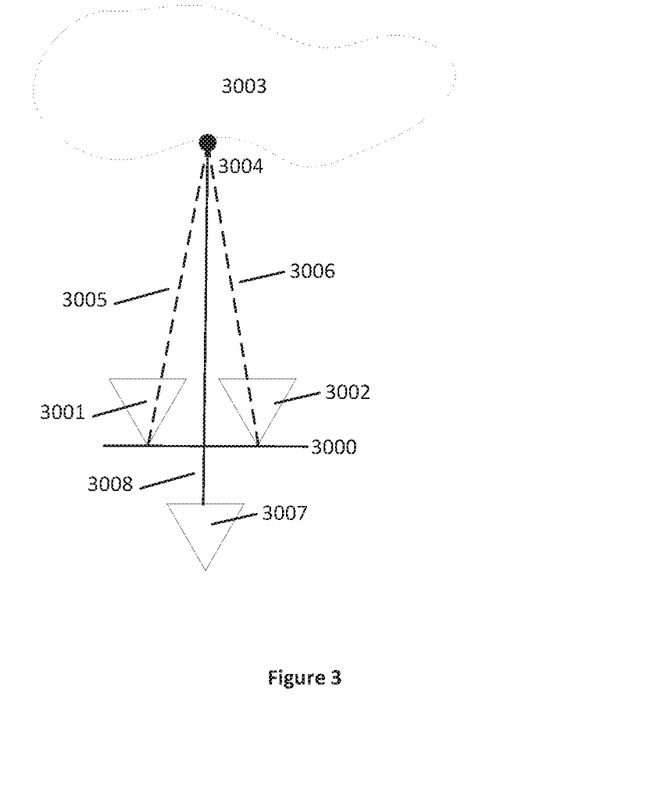
FIG. 3 illustrates an example of determining a ray.

FIG. 3 illustrates an example of determining a ray. In an example grid 3000 there are two cameras 3001 and 3002. There is also an object 3003 with a point 3004 on the object. If the point is inbetween the cameras, then the ray 3008 that could be utilized by virtual camera 3007 could come from ray 3005 or ray 3006.

Figure 4A:
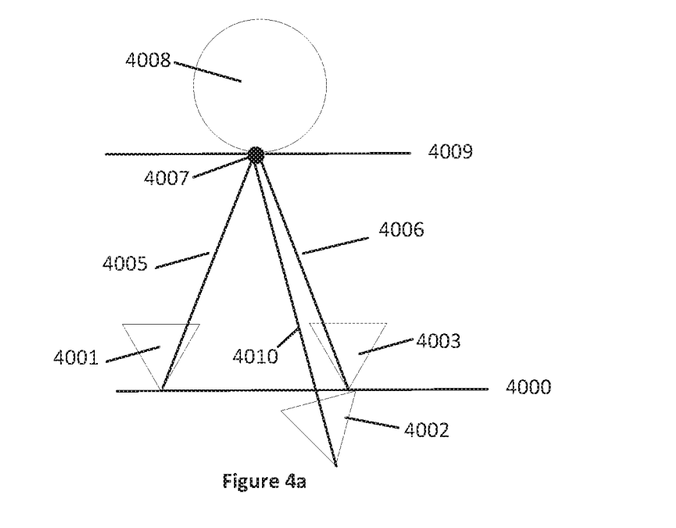
FIG. 4a illustrates an example array of cameras rendering an image with a known depth of a computer-generated scene with a placed object and a known depth of that object.

FIG. 4a illustrates an example array of cameras rendering an image with a known depth of a computer-generated scene with a placed object and a known depth of that object. In the grid 4000 there are 2 cameras 4001 & 4003. 4002 is the new camera view generated from the existing camera views. 4010 is one ray to be rendered in the new image. There are two rays, ray 4005 from camera 4001 and ray 4006 from camera 4003 which can both be directed at point 4007 on object 4008. The depth of point 4007 is known because the depth of the object is known beforehand.

Figure 4B:
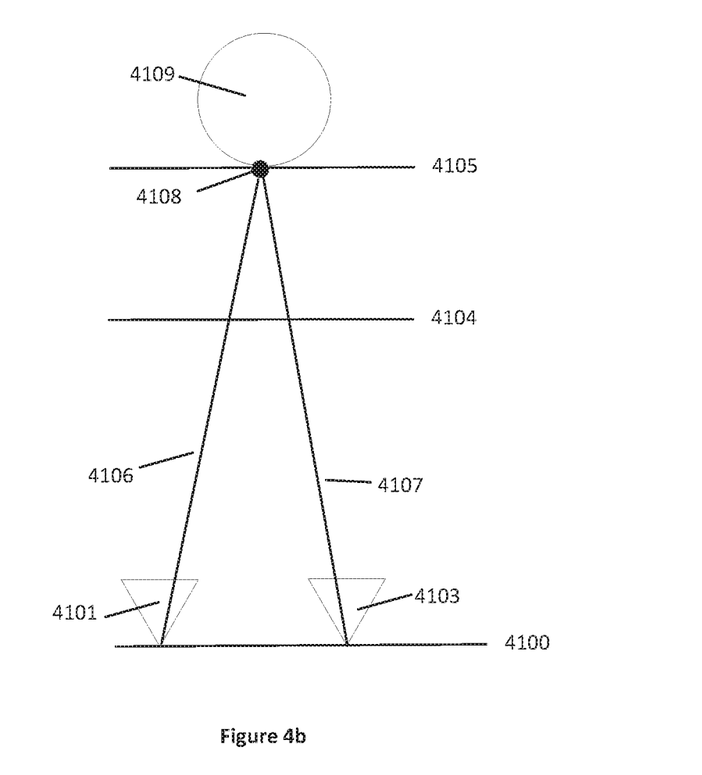
FIG. 4b illustrates an example array of cameras rendering an image with an unknown depth of an object, like that of FIG. 4a, where the rendered depth is different.

FIG. 4b illustrates an example array of cameras rendering an image with an unknown depth of an object, like that of FIG. 4a, where the rendered depth is different. The grid 4100 corresponds to that of grid 4000. The grid 4100 has cameras 4101 & 4103. The previous depth 4104 corresponds to that of the depth plane 4009. FIG. 4b shows that simply with the same object 4008 and 4109 and with unknown depths, any depth plane, including that of 4104 and 4105, could be used for the rendering algorithm. To accurately render object 4109, ray 4106 and ray 4107 are used which go to point 4108 which is the point intersection object 4109 and depth plane 4105. Using other rays not at the correct depth plane for the ray being rendered would produce artifacts. Therefore, it is critical to know the true depth of the object in order for the objects in the scene to be correctly reconstructed.

Figure 4C:
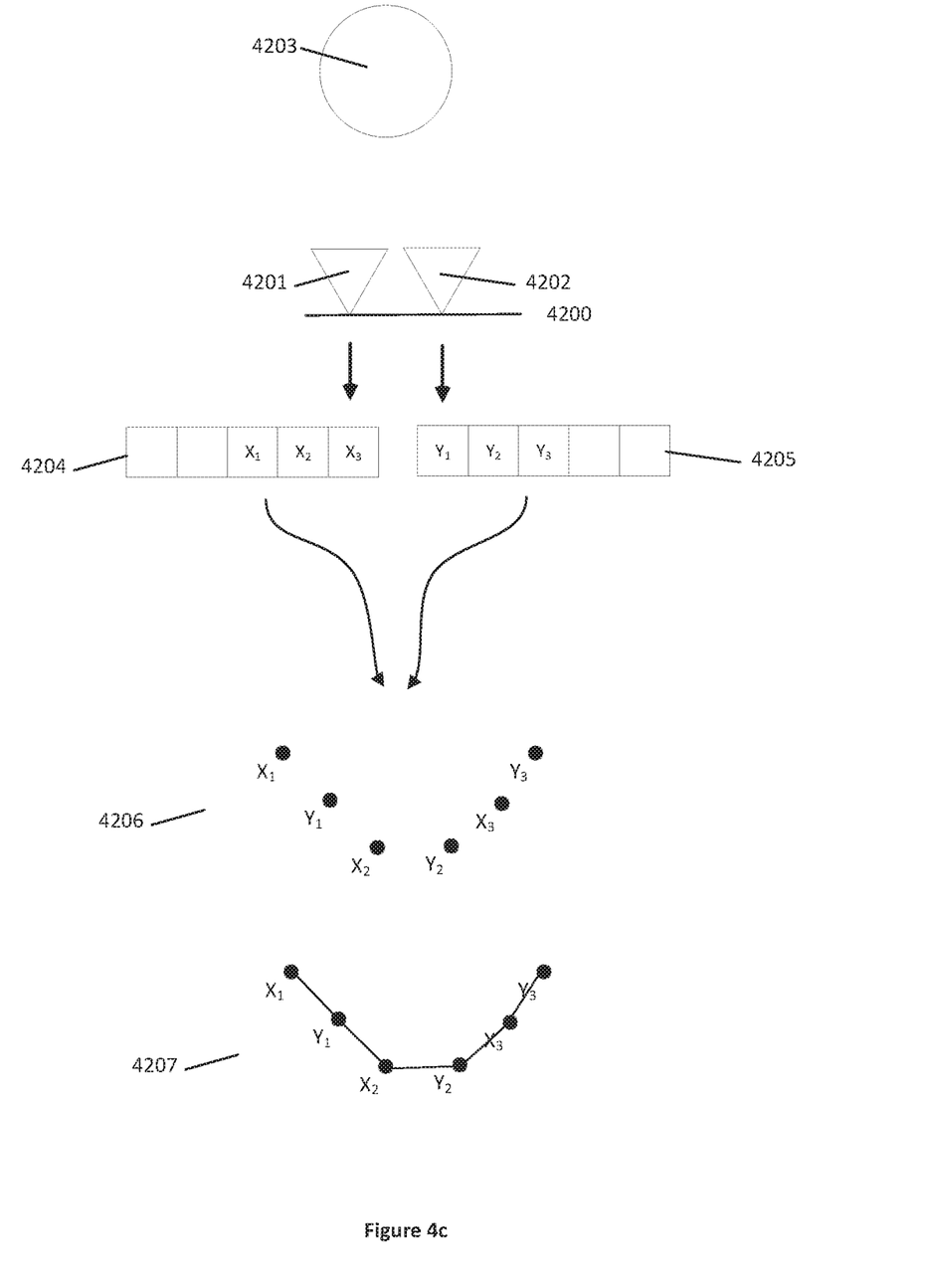
FIG. 4c illustrates the generation of the depth of a scene due to the addition of depth information from depth cameras.

FIG. 4c illustrates the generation of the depth of a scene due to the addition of depth information from depth cameras. The depth from a depth camera is determined by indexing into the depth image of a depth camera, which is a depth value per depth image relative to the position of the camera. In the example embodiment, two depth cameras 4201 and 4202 are situated in a grid 4200. They each capture a depth image of object 4203 in the scene. Camera 4201 generates the example 1D depth image 4204 with values of $X_1$, $X_2$, and $X_3$ representing potential depth values of object 4203 from the perspective of camera 4201. Camera 4202 generates the example 1D depth image with values of $Y_1$, $Y_2$, and $Y_3$ of object 4203 from the perspective of camera 4202. The combination of the depth images can then be used to generate a point cloud 4206. The point cloud is triangulated to get the scene geometry. The scene geometry, using triangulation, can help to re-generate the depth and surface of the object, as seen in the generated image of 4207.

Figure 5:
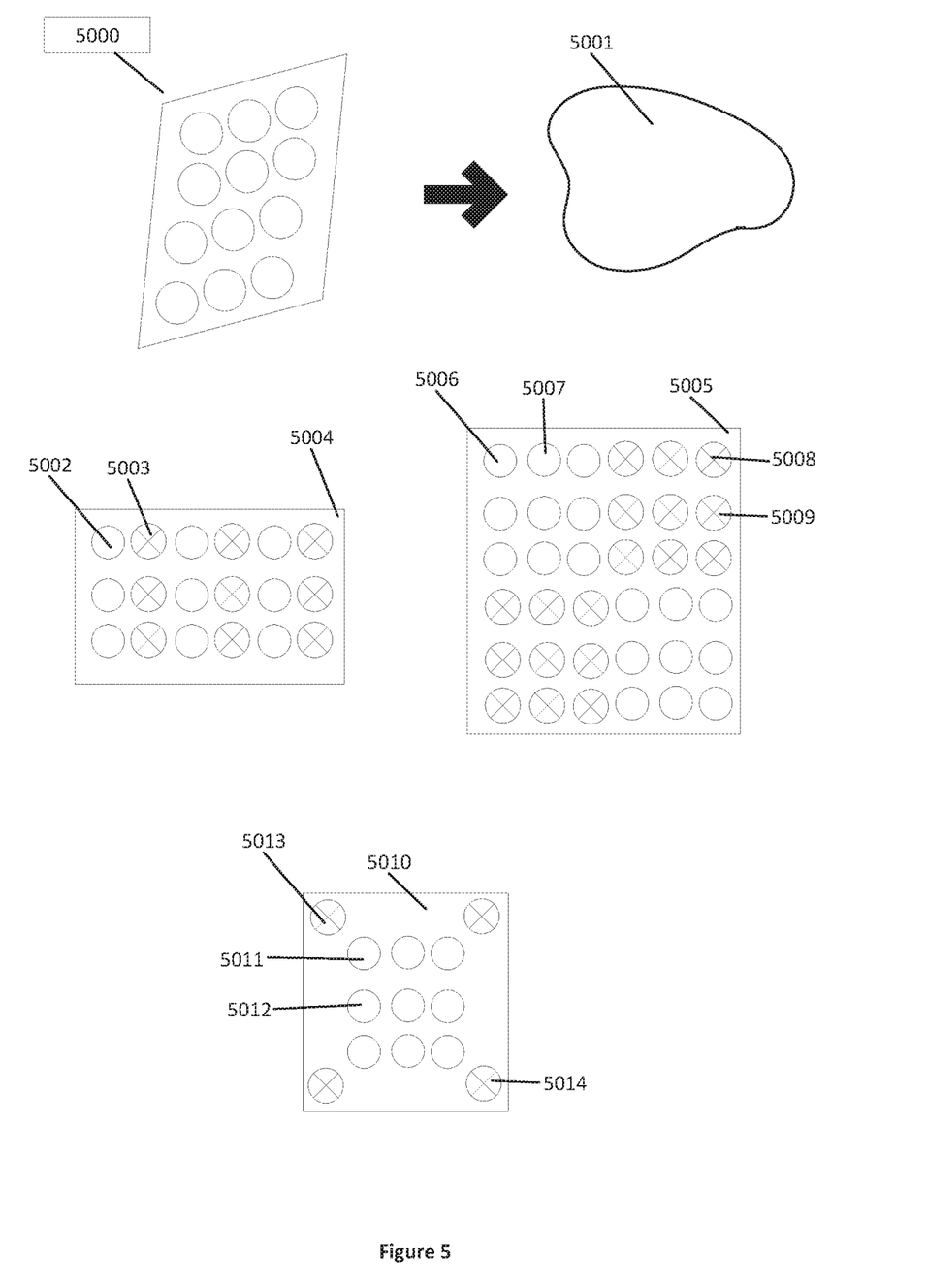
FIG. 5 illustrates the depth cameras situated with a multi-camera array.

FIG. 5 illustrates the depth cameras situated with a multi-camera array. In one example embodiment of the invention, depth cameras can be calibrated with the image cameras so the positions relative to each other are known. Cameras and depth cameras may be configured on a single plane 5000 with all cameras facing the same direction of a scene 5001. In the example, with a single play 5000, you could have image cameras, represented by a circle, such as image camera 5002, and depth cameras, represented by a circle with an "X" in the center, such as depth camera 5003. Grid 5004, which from the viewpoint of the cameras is toward the reader, can be situated with alternating image and depth cameras. Alternatively, depth and image cameras may be clustered, as shown in grid 5005, where image cameras 5006 & 5007, representing two of a cluster of image cameras, are grouped in a 3-by-3 sub-grid within the grid 5005, and depth cameras 5008 & 5009, representing two of a cluster of depth cameras, are grouped in a 3 by 3 sub-grid within the grid 5005. Different camera configurations may be used depending on the scene, scene depth complexity, objects in the scene, and the sampling and error rates required. In another alternative example, grid 5010 shows that some cameras may be clustered while others are distributed. In grid 5010, the image cameras, as shown using example image cameras 5011 & 5012 are grouped in a sub-grid whereas depth cameras are distributed as shown by depth cameras 5013 and 5014. Note also that in this example, there are a different number of depth and image cameras. Note also that, depending on need, the number of depth and image cameras may not be uniform and the number of depth cameras may be more than image cameras and there may also be the situation where the opposite is true. Likewise, the placement of the cameras in grid 5010 has the depth cameras on the outside, but the configuration may be flipped depending on the use case of the quality of the render as well as the characteristics of the scene.

In other example embodiments, cameras and depth cameras can be configured in a ring or sphere pointing from inside to outside with cameras on various points to capture a room scene. Cameras and depth cameras can be configured on a box, with each side of the box representing a plane, with each plane being a grid as described earlier. Cameras and depth cameras can also be configured in a ring, half ring, sphere, or half sphere facing inwards aimed at a common point. This allows capturing specific objects instead of an environment or scene. In each of the configurations described, cameras and depth can also be positioned in arbitrary positions and arbitrary numbers of image or depth cameras. In other example embodiments, the configurations can also be combined depth plus image cameras, where the camera captures both the depth and image in the same image capture.

Figure 6A:
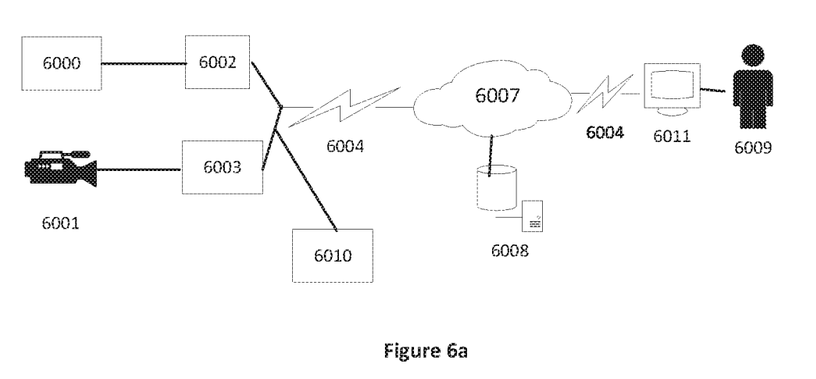
FIG. 6a depicts a system of an example embodiment of a depth and image multi-camera array render an image.

FIG. 6a depicts a system of an example embodiment of a depth and image multi-camera array render an image. In one example embodiment an image camera array/grid 6000 may be used to capture one or more images. A depth camera array/grid 6001 is also used to capture the depth of a scene or objects within the scene. Processors 6002 and 6003 process the data from the image camera array 6002 and depth camera array 6003, respectively. Data can be processed immediately and a new image can be rendered and put into storage 6010. Storage here may be any one of a database, RAM, flash memory, hard disk drive, or any other physical storage connected to the cameras 6000, 6001. The cameras and storage 6010 are connected via a bus 6005 or 6006. The physical camera configuration may be connected via a network, wherein the network may be WiFi, internet, intranet, etc. At any point, any of the information can be separately processed in the cloud first before being stored or processed within the system of the light field camera. The cloud processing may receive any range from the full set of raw data, compressed data, encrypted data, or a subset of the data that is captured by the light field camera. After information is passed via a communication medium 6004 to the network 6007, which could be an internal network or the cloud, the data may be further stored in storage 6008. Finally the rendered data may be passed to viewing devices 6011 to be viewed finally by an end user 6009.

Figure 6B:
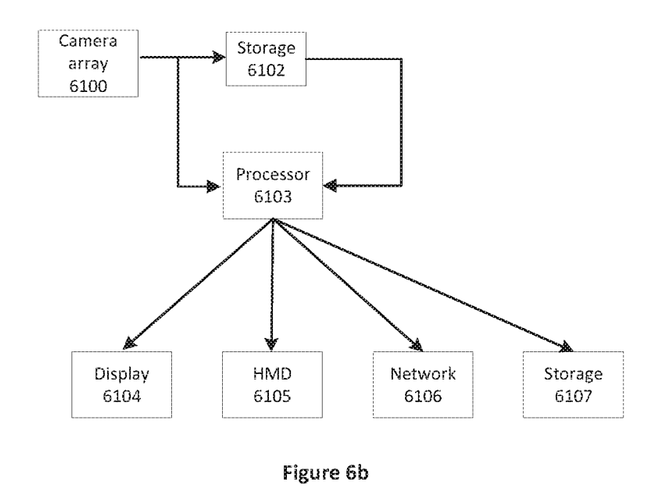
FIG. 6b depicts another example embodiment of a system where a depth and image multi-camera array render an image.

FIG. 6b depicts another example embodiment of a system where a depth and image multi-camera array render an image. The multi-camera array 6100, comprised of one or more image cameras and one or more depth cameras, captures images. The image data may immediately be placed in storage 6102 in a raw format or immediately sent to a processor 6103. If it is stored in storage 6102 first, it may also be played back to the processor 6103 for processing thereafter. The processor 6103 can then output the processed information to any number of outputs, such as a display 6104, a head-mounted display 6105, a network 6106, or other storage 6107. Examples of a display may be a television, monitor, touch screen, mobile device, etc. Examples of a head-mounted display may be virtual reality goggles, augmented reality goggles, attachments to glasses, helmets with a display or heads up display (HUD), etc.

Figure 7A:
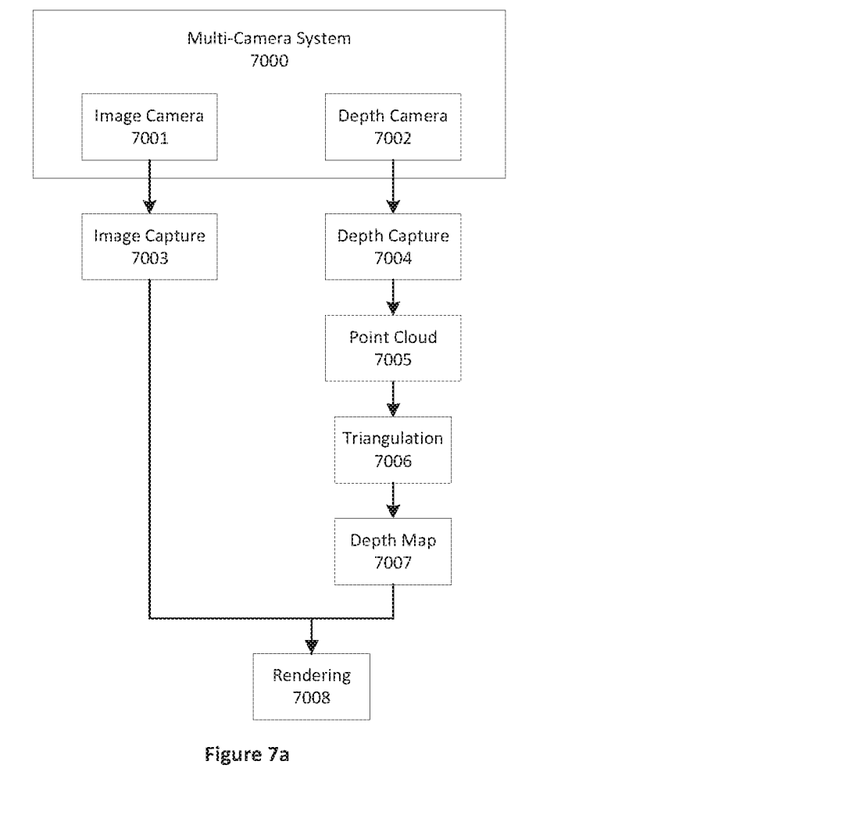
FIG. 7a illustrates an example flow in generating the data for rendering an image from one or more images and captured depth from one or more depth cameras.

FIG. 7a illustrates an example flow in generating the data for rendering an image from one or more images and captured depth from one or more depth cameras. A multi-camera system 7000 contains an assortment of image cameras 7001 and depth cameras 7002 that may be configured in any way as described in FIG. 5. The image cameras 7001 provide image captures 7003, while the depth cameras 7002 provide depth captures 7004. In other example embodiments, the image and depth may be captured by the same camera in an image-plus-depth camera. The depth capture 7004 may be stored and then converted into a point cloud 7005 by using one or more of each of the depth images generated in the depth capture 7004. Triangulation 7006 converts the point clouds into triangles, which represent the scene geometry. A depth map 7007 may be optionally created, which represents each of the depth maps for one or more of the pixels of one or more of the image cameras 7001. This is optional as a processor could always make this mapping in real-time using the point cloud 7005; however, to save processing time it is better to pre-create the depth map 7007 before passing the information to the rendering process 7008. In addition to the depth map, the rendering process also receives the scene geometry from the earlier triangulation 7006, as well as the image information from the earlier image captures 7003.

Figure 7B:
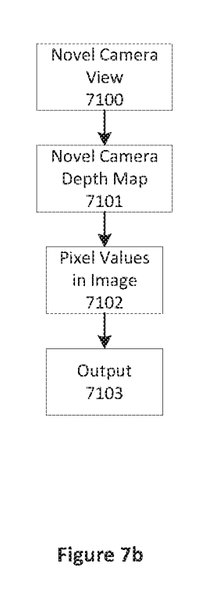
FIG. 7b describes the process of taking all the image and depth values from FIG. 7a to render a final image.

FIG. 7b describes the process of taking all the image and depth values from FIG. 7a to render a final image. A view or perspective of a scene is chosen and a camera view or novel camera view 7100 is chosen. A depth map 7101 for the novel camera view is created using one or more of the triangulated geometry, which was previously generated from the point cloud. This may be done using any number of depth map generation techniques, such as rasterization, ray tracing, etc. Pixel values for the image 7102 are then generated using the combined camera images and the depth maps created per camera. A pixel encapsulates the combined depth and image information due to its appearance in the final image. The final rendered image is output 7103.

Figure 7C:
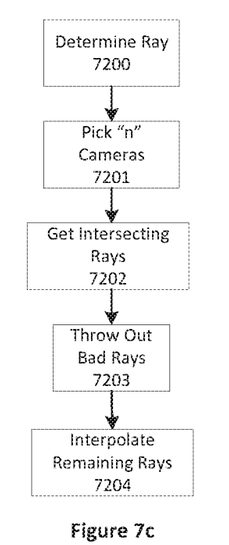
FIG. 7c illustrates the process flow to compute a pixel in an image from an arbitrary novel camera view.

FIG. 7c illustrates the process flow to compute a pixel in an image from an arbitrary novel camera view. The images that are rendered are comprised of pixels. For each pixel, a ray for the novel camera must be determined 7200. The ray must be within the bounds of the camera grid. If it is not, the ray is ignored or an arbitrary value for the pixel may be used, such as using a black color. The ray is computed as the value for that pixel for the novel camera view. For the particular ray, the n closest cameras are picked for that pixel. The number of cameras, n, chosen determines the effect for the image that is desired such as depth of field. The n simulates the aperture of the camera, how much light or rays are used for an image, therefore, it is up to the user to decide how large an aperture to have.

Using the depth of the ray of the novel camera, you get the intersecting rays 7202 for that depth from the closest cameras. If there are no rays from any of the closer cameras, those are dropped. You can also expand n if you need more rays or information. In 7202 you now have the correct depth for the novel camera and the intersecting arrays. The depth and rays from 7202 are compared with the depths of the rays from the n-closest cameras, wherein the depths were previously calculated per camera depth maps (or alternatively, depth maps per camera calculated in real-time). Rays that have the same depth relative to a common plane such as the input camera plane are kept later for interpolating the final image. Those that are incorrect are thrown out 7203. In the case where all the arrays are considered incorrect in 7203, you keep the ray with largest depth because it reduces artifacts the most in the image. Another option is to look at neighboring rays and performing aliasing. In other words, you see if those neighboring rays have the correct depth within a threshold of error, where the larger the threshold you choose, the greater risk of artifacts there might be in the final rendered image. The remaining rays are interpolated 7204 to create the final value that is used for the pixel.

In FIGS. 7a to 7c, it is assumed that the cameras are calibrated. The calibration would be both intrinsic, meaning that the camera properties of each camera are known in order to calculate and extract desired rays from the camera images, and extrinsic, meaning how the cameras positions related to each other in order to map images to where they are captured in space relative to the camera positions. However, there is also a need for an extrinsic calibration between the depth cameras and the image cameras to map the positions of the images to the depth images and eventual point cloud. One way to perform this is to put an object in the scene that can be seen and identified by both the depth and color cameras. For example, you can place one or more ping pong balls at different locations and calibrate the depth and image cameras. Alternatively, you can use known patterns, such as a checkerboard where some of the spaces are mirrors and in this way the object is identifiable.

Figure 8:
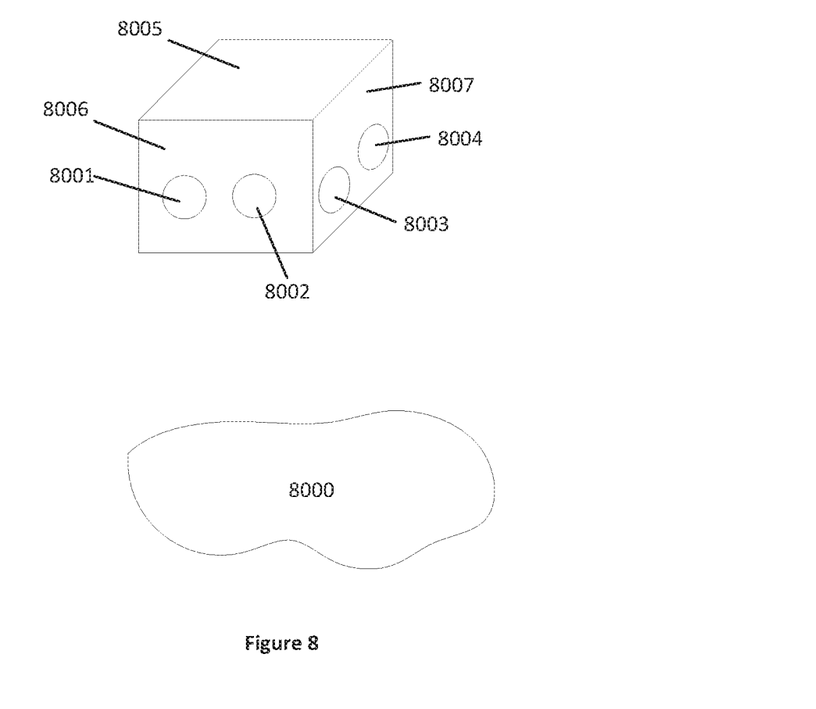
FIG. 8 illustrates an example of calibrating a multi-camera array in accordance with one more embodiments.

FIG. 8 shows an example of calibrating in instances where the light field camera or multi-camera array is situated such that no object can be seen by all cameras at once. In FIG. 8, an object 8000 wraps around a cube grid 8006 with planes 8006 and 8007. There are cameras 8001 and 8002 on plane 8006 and camera 8003 and 8004 on plane 8007. Because plane 8006 and 8007 are facing different directions all points of object 8000 may not be viewable at once. However, using transitive calibration, you can calibrate camera 8001 to 8002 using parts of object 8000 and cameras 8003 and 8004 using other parts of object 8000. Then you can calibrate cameras 8002 to 8003 using yet another section of object 8000. Then because all the cameras are calibrated to another camera that is linked in some calibrated way, the whole light field system is calibrated.

Several example embodiments of the present invention are specifically illustrated and described herein. The advantages and features of the application are of a representative sample of embodiments only, and are not exhaustive and/or exclusive. They are presented only to assist in understanding and teaching the claimed principles. It should be understood that they are not representative of all claimed inventions. Moreover, they are not to be limited to the technologies or devices described herein. That an alternate embodiment may not have been presented is not a disclaimer of such alternate embodiment. It will be appreciated and understood that other embodiments may be utilized and functional, logical, organizational, structural and/or topological modifications may be made without departing from the scope and/or sprit of the embodiments discussed herein relative to those not discussed herein other than it is for purposes of non-repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others.

In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs and/or characteristics of an individual, entity, and/or enterprise user, database configuration and/or relational model, data type, data transmission and/or network framework, syntax structure, and/or the like, various embodiments of the invention, may be implemented that enable a great deal of flexibility and customization.

What is claimed is:

1. A method of rendering new images, comprising:
   acquiring a set of images of a scene using a set of image cameras, each of the image cameras in the set of image cameras being positioned within a multi-array grid towards the scene;
   acquiring a set of depth values of the scene using a set of depth cameras, each of the depth cameras in the set of depth cameras being positioned within the multi-array grid towards the scene and the set of image cameras and the set of depth cameras comprise different camera types;
   generating, based on the set of depth values, a geometry of the scene;
   determining, a new camera position of the scene that is different than positions of the set of image cameras in relation to the scene and positions of the set of depth cameras in relation to the scene;
   generating, based on the acquired set of images of the scene and the geometry of the scene, pixel values associated with the new camera position of the scene, wherein generating a pixel value of the pixel values comprises:
      determining a ray associated with the new camera position of the scene, wherein the ray intersects a first portion of the geometry of the scene;
      determining, based upon a location of the first portion of the geometry of the scene, a first plurality of rays, each ray in the first plurality of ray intersects the first portion of the geometry of the scene;
      acquiring, based on the set of depth values of the scene, a depth value associated with each of the first plurality of rays;
      filtering, based on the depth values associated with each of the first plurality of rays, rays from the first plurality of rays that do not have a same depth value relative to a common plane to generate a second plurality of rays; and
      interpolating one or more rays of the second plurality of rays to generate the pixel value; and
   rendering the pixel values to generate an image of the scene from the new camera position.

2. The method of rendering new images according to claim 1, wherein the scene geometry is derived from a point cloud.

3. The method of rendering new images according to claim 2, wherein the point cloud is derived from the set of depth values.

4. The method of rendering new images according to claim 1, wherein the set of image cameras and the set of depth cameras are arranged in alternating order within the multi-array grid.

5. The method of rendering new images according to claim 4, wherein the multi-array grid is a grid in a plane.

6. The method of rendering new images according to claim 1, further comprising calibrating the set of depth cameras with the set of image cameras.

7. The method of rendering new images according to claim 6, wherein the calibrating uses objects that can be identified in depth.

8. The method of rendering new images according to claim 6, wherein the calibrating uses known objects.

9. The method of rendering new images according to claim 6, wherein the calibrating uses objects that can be seen by multiple cameras.

10. The method of rendering new images according to claim 1, wherein the scene geometry is used to determine rays for generate an image of the scene from the new camera position.

11. The method of rendering new images according to claim 1, wherein the first plurality of rays comprises at least four rays.

12. A system for creating a rendering of images comprising:
    one or more processors; and
    a memory coupled with the one or more processors, the memory configured to store instructions that when executed by the one or more processors cause the one or more processors to:
       acquire a set of images of a scene using a set of image cameras, each of the image cameras in the set of image cameras being positioned within a multi-array grid towards the scene;
       acquire a set of depth values of the scene using a set of depth cameras, each of the depth cameras in the set of depth cameras being positioned within the multi-array grid towards the scene and the set of image cameras and the set of depth cameras comprise different camera types;
       generate, based on the set of depth values, a geometry of the scene; determining, a new camera position of the scene that is different than positions of the first set of image cameras in relation to the scene and positions of the set of depth cameras in relation to the scene;
       generate, based on the acquired set of images of the scene and the geometry of the scene, pixel values associated with the new camera position of the scene, and to generate a pixel value of the pixel values:
          determine a ray associated with the new camera position of the scene,
          wherein the ray intersects a first portion of the geometry of the scene;
          determine, based upon a location of the first portion of the geometry of the scene, a first plurality of rays, each ray in the first plurality of ray intersects the first portion of the geometry of the scene;

acquire, based on the set of depth values of the scene, a depth value associated with each of the first plurality of rays;

filter, based on the depth values associated with each of the first plurality of rays, rays from the first plurality of rays that do not have a same depth value relative to a common plane to generate a second plurality of rays; and interpolate one or more rays of the second plurality of rays to generate the pixel value; and render the pixel values to generate an image of the scene from the new camera position.

13. The system for creating a rendering of images according to claim 12, wherein the set of image cameras and the set of depth cameras are arranged in alternating order within the multi-array grid.

14. The system for creating a rendering of images according to claim 12, wherein the scene geometry is used to determine rays for generate an image of the scene from the new camera position.

15. The system for creating a rendering of images according to claim 12, wherein the first plurality of rays comprises at least four rays.

* * * * *